March 2, 1926.
A. MOORHOUSE
MOTOR VEHICLE
Filed May 10, 1923
1,575,176
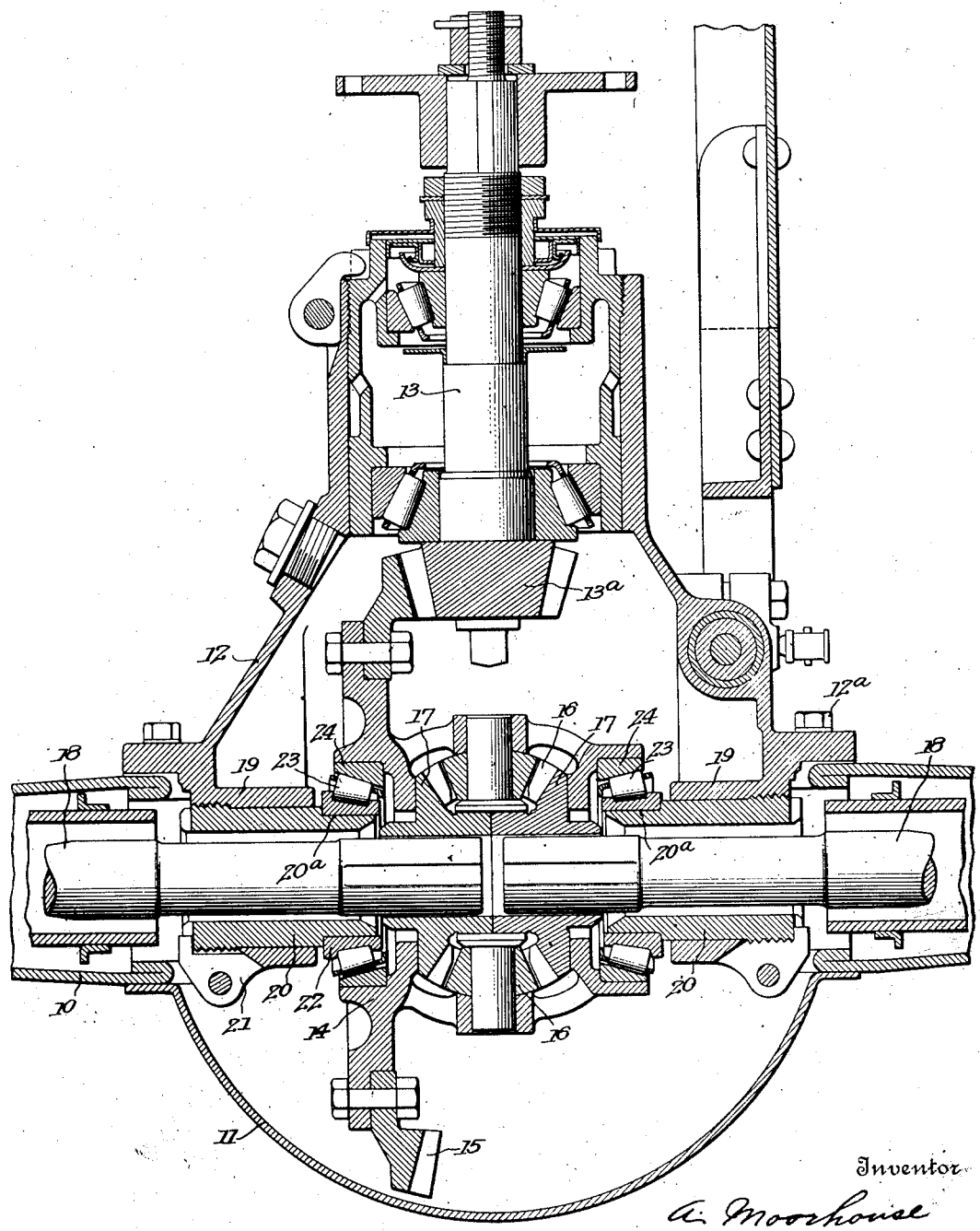

Patented Mar. 2, 1926.

1,575,176

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed May 10, 1923. Serial No. 638,063.

*To all whom it may concern:*

Be it known that I, ALFRED MOORHOUSE, a citizen of the United States, and resident of Detroit, Wayne County, State of Michigan, have invented certain new and useful Improvements in Motor Vehicles, of which the following is a specification.

The present invention relates to motor vehicles and more particularly to the rear axle construction thereof.

The invention has particular reference to the arrangement and method of mounting the bearings which support the differential cage of the axle. The principal object is to provide a construction in which the race rings of these bearings are so supported as to eliminate the possibility of any distortion thereof. Heretofore it has been common practice to support the outer race rings of the bearings in a divided housing, the members of which are clamped together by screws and I have discovered that the clamping of these members on the race rings some times produces slight distortions of the race rings. Even a very slight distortion of the rings, effecting only a minute departure from trueness of the race ways, causes uneven wear which ultimately results in a looseness of the bearings which cannot be remedied by adjustment. Such distortion, with its resulting wear, also renders the bearing noisy.

In accordance with the present invention the outer race rings of the bearings supporting the differential cage have a nice but non-clamping fit in seats formed in the sides of the differential cage, and the inner race rings have a careful non-distorting fit on seats carried by longitudinal adjustable sleeves surrounding the axle shafts and supported by the axle housing. This construction eliminates any possibility of the race rings becoming distorted, and at the same time is simple, strong, easy of adjustment, and permits rapid assembling of the parts.

Another object of the invention is to arrange the bearings supporting the cage in such manner that they are better adapted to take the radial and thrust loads than in prior constructions. This object is accomplished by disposing the tapered rollers of the bearings so that the axes thereof converge towards the differential cage, that is to say, the rollers are disposed with the small ends thereof adjacent the cage, whereby the bearing surfaces are more nearly normal to the load.

Other objects and features of novelty will be apparent from the description taken in connection with the drawings in which the single figure is a horizontal sectional view through the central portion of a rear axle construction having the present invention incorporated therewith.

Referring to the drawing, the numeral 10 designates the axle casing or housing which may be of any accepted construction having the usual front and rear openings at the central portion thereof. The rear opening is closed by a substantially semi-spherical plate 11 which is secured to the housing and the front opening is closed by a frame 12 which is secured to the casing by bolts such as indicated at 12$^a$, and this frame carries the stub shaft 13 journaled in tapered roller bearings supported in a cage which is adjustably secured in said frame. These parts are well known and hence need no further description.

As previously stated, the present invention relates to the bearings supporting the differential cage. This cage 14 may be of any accepted construction. As shown, it has bolted thereto the large bevel ring gear 15, which meshes with the driving pinion 13$^a$ on the stub shaft 13. It also carries the small bevel planet gears 16 which mesh with the bevel sun gears 17 non-rotatably secured on the ends of the axle shafts 18. The frame 12 has rigid therewith a pair of lugs 19 formed with bores which are coaxial with the axle casing 10 and are interiorly threaded at their outer ends to receive the threaded outer ends of the sleeves 20. These sleeves at their outer ends are formed with notches adapted to receive lock dogs 21 which are mounted on the lugs, whereby the sleeves may be locked in adjusted position. The ends of the sleeves adjacent the differential cage are reduced to form shouldered seats 20$^a$ for the inner race rings 22 of the bearings supporting the cage. These rings are carefully fitted on the seats thus provided and abut the shoulders formed by the reduced portions of the sleeves.

The outer race rings 24 are mounted in rabbetted seats provided in the sides of the differential cage. These seats are formed in annular flanges at the sides of said cage and have cylindrical surfaces and inner shoulders adapted to abut the inner sides of the outer race rings. These outer race rings are carefully fitted in these seats, and thus supported in non-clamping and non-wedging relation to their seats, whereby the rings are not subject to any distortion by the manner of supporting them.

Interposed between the inner and outer race rings are a series of conical rollers 23 and these rollers are positioned so as to take the load to which the cage is subjected, in the most efficient manner. Thus the rings are constructed and the rollers disposed so that the apices of the rollers are located on the cage side of the bearings. In other words the rollers are arranged so that their small ends are positioned next to the cage. The thrust of the pinion 13ª on the ring gear 15 tends to turn the cage in a counterclockwise direction as viewed in the drawing. The rollers of the left hand bearing, in front of the axle, and the rollers of the right hand bearing, in rear of the bearing, resist this tendency to turn and in the form of the invention shown are disposed so that they are better adapted to take the load due to this thrust than if the rollers were positioned so that the small ends thereof would lie at the outer sides of the bearings.

Although a specific embodiment of the invention has been described in detail, it is to be understood that the invention is not thus limited but includes modifications and changes which come within the scope of the appended claim.

Having thus described the invention what is claimed as new and desired to be secured by Letters Patent is:

In a rear axle structure for motor vehicles, in combination, a tubular axle casing having a central front opening, a cover frame secured to said casing over said opening, a pair of lugs integral with said frame and coaxial with said casing, sleeves screwed in said lugs and having adjusting notches at their outer ends, dogs mounted on said lugs adapted to engage said notches to hold said sleeves in adjusted positions, a differential cage between the inner ends of said sleeves, said cage having an annular flange on each side thereof coaxial with said sleeves and said sleeves having reduced inner ends projecting into said flanges, an outer race ring seated in each of said flanges, an inner race ring seated on the reduced end of each sleeve and abutting the annular shoulder formed by said reduced end, the bearing faces of said race rings being conical and said inner race rings having marginal shoulders, and tapered rollers between said inner and outer rings.

In testimony whereof I hereunto affix my signature.

ALFRED MOORHOUSE.